May 29, 1934.        G. MUFFLY        1,960,790
MOTOR AND CONTROL THEREFOR
Filed Feb. 12, 1930
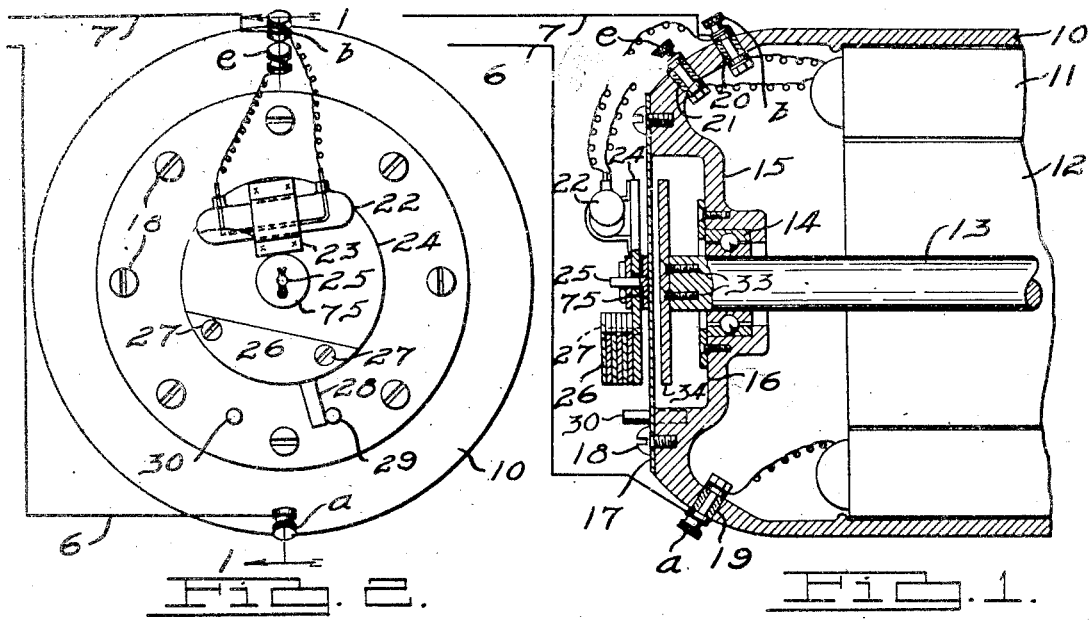
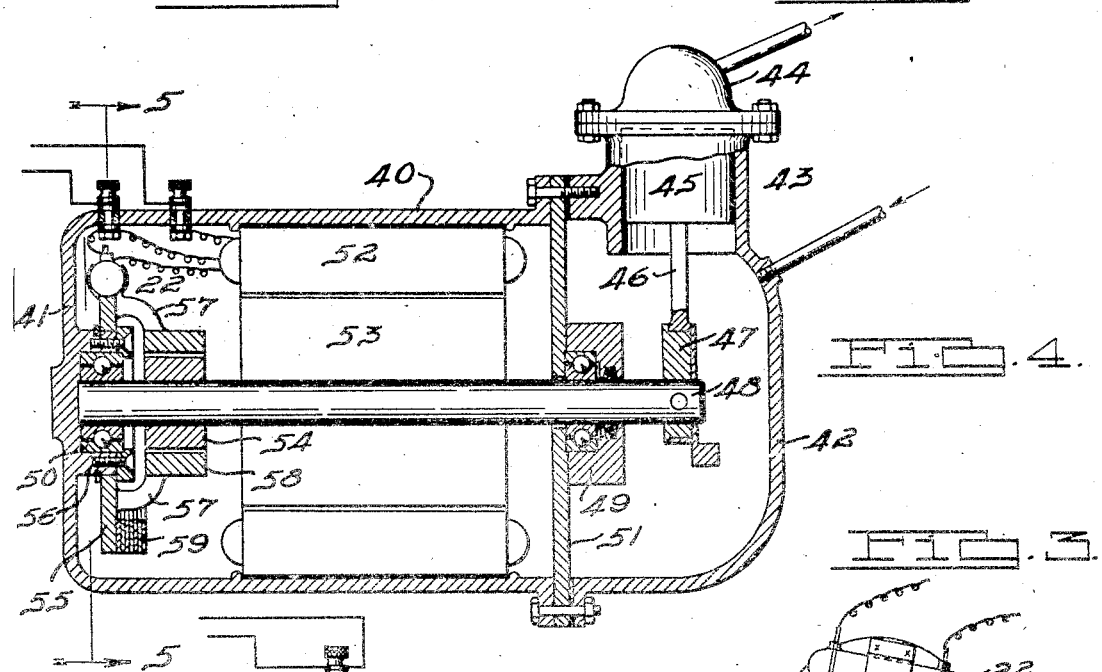
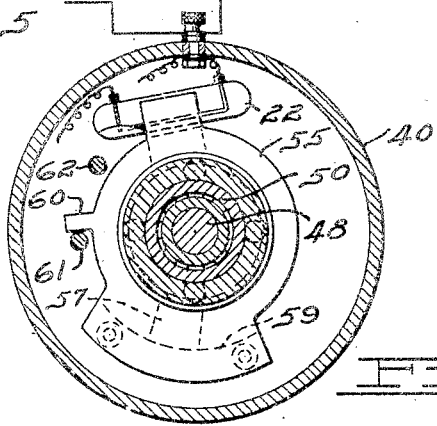
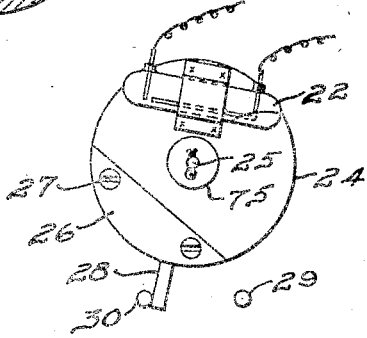
INVENTOR
Glenn Muffly.
BY
ATTORNEYS.

Patented May 29, 1934

1,960,790

UNITED STATES PATENT OFFICE 1,960,790

MOTOR AND CONTROL THEREFOR

Glenn Muffly, Richmond, Mich.

Application February 12, 1930, Serial No. 427,982

6 Claims. (Cl. 172—279)

One of the main objects of this invention is to provide an electric motor suitable for use in a "sealed-unit" type of electric refrigerating system and in other types of apparatus where it is desired to seal the contacts of the circuit breaker in the starting circuit away from the gases that surround the motor.

Another object is to provide an electric motor with a gas-tight casing and starting means independent of arcing contacts within said casing.

A still further object is to make the split-phase type of electric motor available for use in special applications such as the "sealed unit" type of refrigerating systems, which are defined as "systems that do not depend upon contacts between relatively moving parts for refrigerant retention".

Existing motors used for such purposes are unsatisfactory on account of the circuit-breaking contacts being exposed to the gas that surrounds the working parts of the motor or because of the fact that the circuit-breaking switch in the starting circuit is not directly responsive to motor speed.

Motors used for this type of equipment have been provided with circuit breakers which act in response to a time element or in response to variations in an electric current. These are not entirely satisfactory because a fixed time is not always correct for the duration of the starting circuit and variations in voltage affect the operation of the current-responsive devices.

My invention provides for the opening of the starting circuit at the correct instant, as determined by the speed of the motor, and it also provides against the arcing of the circuit breaker affecting the gas that surrounds the working parts of the motor.

The above being among the objects of the present invention, the same consists in certain novel features of construction and combination of parts to be hereinafter described with reference to the accompanying drawing, and then claimed, having the above and other objects in view.

Figure 1 is a partial sectional view of one design of motor embodying my invention.

Figure 2 is an end view of the switch mechanism mounted on the end of the motor shown in Figure 1. This view shows the switch closed, as is the case when the motor is idle or when it is operating below the speed required to open the switch in the starting circuit.

Figure 3 shows a view similar to Figure 2, but with the switch in the open position which is maintained while the motor is running at normal speed or a speed greater than that required to open the starting circuit.

Figure 4 shows one variation of my invention in which the circuit breaker is located within the sealed casing of the motor, but with the contact points sealed away from the gas contained within the motor casing. This view also shows an example of a mechanism contained within the gas-tight casing of the motor and driven by the motor. The example used is a compressor such as might be used in a sealed-unit refrigerating system.

Figure 5 is a sectional view taken on the line 5—5 of Figure 4.

In these views and in the description I refer to circuits such as are used in "split phase" motors, but the same switch mechanism is applicable to the condenser type of motor as well, hence nothing herein is to be construed as limiting my invention to split phase motors.

Referring to Figure 1, it will be seen that an electric motor is shown more or less diagrammatically, as comprising an imperforate casing frame 10, provided with the usual stator 11, and rotor 12, the latter being mounted on the shaft 13, with its end suitably supported by the bearing 14, mounted in the end 15 of the frame 10. The shaft 13, projects through the casing and into the recess 16, formed in the end 15. Leakage of refrigerant out of this end of the frame 10 is prevented by means of a flat closure plate 17 of non-magnetic material, which is secured thereto by screws such as 18, and seals the outer end of the recess 16. It will be seen that the power lines 6 and 7 connect with the terminals "a" and "b", which are insulated as at 19 and 20 respectively from the frame 10, and these terminals are connected internally of the casing 10, with the stator 11 of the motor. It will also be seen that the terminal "c", which is provided for the starting circuit, is insulated from the frame 10 as at 21, and this starting circuit is shown as including a switch 22, shown in the form of the well known type of mercury switch. Other wiring diagrams would, of course, be used for other arrangements of terminals and for condenser type motors, but in all cases of motors to which my invention is applicable it is to be understood that there is a starting circuit and a running circuit with means for opening the starting circuit when the motor approaches or reaches its normal running speed.

The switch 22 is shown as being secured as by the clip 23, to the disc 24, formed of a metal capable of re-acting to magnetic influences, and which is rotatably mounted on the pin 25 secured to the plate 17 in axial alignment with the shaft 13 and in close proximity to the plate 13. The disc 24 is provided with a weight 26, shown as being secured thereto by screws 27, and this weight 26 is so positioned on the disc 24 with relation to the switch 22 as to be acted upon by the force of gravity to move the switch 22 to closed circuit position, as indicated in Figure 2. For the purpose of limiting the movement of disc 24, and therefore the switch 22 towards closed circuit position, the disc 24 is provided with a finger or lug 28, and the plate 17 is provided with a projecting pin 29, intersecting the path of movement of the finger 28. The pin 29 is so positioned that the force of gravity acting on the weight 26 tends to rotate the disc 24 against the pin 29, in a direction opposite the direction of the rotation of shaft 13. Another pin 30, similar to pin 29, is provided in spaced relation with respect to pin 29, and in intersecting relation with the path of movement of the finger 28, to limit the opening movement of switch 22 as will hereinafter be more apparent.

Secured to the end of shaft 13, as by screws 33, within the recess 16 and in relatively close proximity to the plate 17, is a disc 34, which is preferably permanently magnetized and which therefore acts through the plate 17 upon the disc 24.

It will be apparent in accordance with the well known laws of physics, that when the motor is running the magnetized disc 34, in rotating in proximity to the disc 24, will re-act and create a magnetic drag which will tend to rotate the disc 24 with it, and this tendency of the disc 24 to rotate is of course resisted by the weight 26. The weight 26 may be so proportioned, as by adding to or subtracting therefrom one or more of the laminations of which it is composed, until it is of sufficient mass to prevent substantial rotation thereof until the motor has reached, or nearly reached, its normal running speed, at which time the disc 24 will rotate until the finger 28 engages the stop 30, and which movement of the disc 24 will move the switch 22 to open circuit position. The disc 24 will, of course, be maintained in rotated position with the finger 28 in contact with the pin 30 as long as the motor is running at its normal speed, and as soon as the main motor circuit is broken, or the speed of the motor is reduced a substantial amount below its normal running speed, the weight 26 will act to again rotate the disc 24 and place the switch 22 in closed circuit position so as to again cause operation of the starting circuit upon the application of power to the line.

In this manner it will be apparent that whenever the motor is stopped the starting circuit is automatically placed in closed circuit position, so that upon subsequent closing of the main power circuit, proper starting of the motor is assured. It will also be apparent that the mechanism herein involved is of extreme simplicity, is positive in action, and there is but a single wearing surface in the entire construction, that being between the disc 24 and the pin 25, and the wear at this point will be substantially negligible because of the small arc of oscillation of the disc 24 on the pin 25, and the relatively infrequent periods at which such oscillation will take place.

While the construction shown in Figures 1 and 2 may be employed with the so-called sealed type of mechanical refrigerating mechanism, wherein the refrigerant is allowed to fill the interior of the motor casing, and will insure non-leakage of refrigerant from the motor casing because of the particular construction, including the plate 17, it may be desirable in some cases to include the mechanism entirely within the motor casing instead of partly exterior thereto, as in Figures 1 and 2, and such construction is shown in Figures 4 and 5. In this respect it is to be noted that where this sealing effect of the interior of the motor is not necessary or required, the plate 17 in Figures 1 and 2 will not necessarily be imperforate, as shown, or it may be replaced by an element of entirely different configuration. All that is necessary in such a case being some element to properly rotatably support the disc 24 or its equivalent in adjacent relation to the disc 34.

Referring to Figure 4, I show the present invention in slightly modified form, and adapted to a sealed motor-compressor unit for a refrigerating mechanism. In this figure it will be noted that the motor casing 40 is open at the right hand end, and is provided with an integral closed end wall 41 at the left hand end. The open end of casing 40 is closed by the crank case 42 of a compressor mechanism including a cylinder 43, a cylinder head 44, piston 45, connecting rod 46, and crank or eccentric 47, secured to the motor shaft 48, which is suitably supported in bearings 49 and 50. A plate 51 is preferably located between the motor case 40 and the crank case 42 for supporting bearing 49. The motor is of course provided with the usual stator 52, and rotor 53. In this particular case the magnetic element which is secured to the motor shaft 48, instead of being of disc-like form as in Figures 1 and 2, is cylindrically formed, as at 54. The switch carrying the element 55 is rotatably mounted upon the boss 56 provided for supporting the bearing 50, and the switch 22 is mounted at the upper edge thereof. The element 55 is provided with arms 57, which support the ring 58 in concentric and slightly spaced relation with respect to the cylinder 54, it being understood that the ring 58 serves the same purpose as the disc 24 in Figures 1 and 2, and is formed of a material influenced by the magnetic action of cylinder 54. The element 55 is provided with a weight 59 and with a finger 60, which is adapted to correspond with stop pins 61 and 62, carried by the end wall 41 in much the same manner as corresponding parts above described in connection with Figures 1 and 2. The operation and control of the switch 22 in this construction is identical to that previously described, and therefore acts to close the starting circuit whenever the motor is below its normal or nearly normal speed, and acts to open the circuit whenever the motor reaches its normal running speed.

The well known type of mercury switch 22, which is shown in the drawings, is of simple construction, effective in operation, and is of that type in which the contact points are hermetically sealed within a glass tube, this being a preferable type of switch to employ particularly where the switch is placed within the motor casing as illustrated in Figures 4 and 5, and in which position the contacts, unless hermetically sealed, would be exposed to the gaseous refrigerant within the motor casing. It will be apparent however that where such gaseous refrigerant or other gases are not present, or the construction is such as to eliminate its consideration, any suitable type of electric switch may be employed in place of switch 22, so as to be operated by the relative movement of the oscillatable magnetically influenced member, whether it be of disc-like form as at 24 in Figures 1 and 2, of cylindrical form as at 54 in Figures 4 and 5, or of any other shape, and I therefore do not limit my invention to any particular type of switch or to any specific type of connection between the switch and the oscillatable member other than may hereinafter be apparent in the following claims.

It will be apparent that it is possible to actuate any type of switch by means of simple mechanical connections with the rotating disc. In the event that the switch requires more power than is obtained from the short movement of the disc it would be easy for any good mechanic to increase the available power by the simple expedient of allowing the disc to rotate through a greater arc or even to make several revolutions, using a suitable leverage or gear connection to the switch. This can be done without any increase in the magnetic transmission of torque through the wall 17 as employed in Figures 1 and 2.

It will therefore be understood that I do not limit the scope of my invention to the type of switch used for illustration, nor to the mechanical means disclosed by my drawing. I also wish to make clear the fact that this motor starting means can be used to advantage in other fields than refrigeration. For instance the motor might be used to operate a fan handling combustible gas or vapor such as that exhausted from a lacquer spray booth, in which case the sealing of the arc of the starting circuit breaker away from the gases surrounding the working parts of the motor is important for fire prevention.

The sealing of the motor housing with respect to surrounding atmosphere is not always necessary, as in the last mentioned case of spray booth exhaust. The weight might be replaced by a spring in the event that a rotation of greater than 180 degrees is desired. With suitable mechanical means for limiting the longitudinal movements of the magnetic discs it is possible to attain a high degree of accuracy of response to speed. Longitudinal float of the shaft will have little effect in the construction shown in Figure 4, but mechanical fits must be such that the magnetic elements are held concentric within reasonably close limits.

By making the weight of laminated construction it is possible to adjust the switch cut-out speed after assembly and test of the motor. A similar result may be obtained by making the space between the magnetic elements adjustable, as by changing the number, thickness and location of washers 75 in Figure 1.

While I have referred to switch driving member as the magnetized member, in the above specification, it will be obvious that the switch driven member may be magnetized instead of the driving member without affecting the results acquired, or both members may be magnetized if their polarity is properly arranged.

Formal changes may be made in the specific embodiment of the invention described without departing from the spirit and substance of the broad invention, the scope of which is commensurate with the appended claims.

What I claim is:—

1. In combination with an electric motor having a running circuit and a starting circuit a gas tight housing enclosing said motor, a switch in said starting circuit, a pair of members one of which is magnetized and the other of which is susceptible to magnetic influences and is located within the zone of influence of the first of said members, one of said members being driven in timed relation with said motor and sealed within said housing, and the other of said members being mounted exterior to said housing for movement in response to said magnetic influence and operatively connected to said switch.

2. In combination with an electric motor having a running circuit and a starting circuit, a switch in said starting circuit, a pair of members one of which is magnetized and the other of which is susceptible to magnetic influences and is located within the zone of influence of the first of said members, one of said members being driven in timed relation with said motor, the other of said members being mounted for movement in response to said magnetic influence and operatively connected to said switch, and an imperforate wall sealing said motor and separating said members.

3. In combination with an electric motor having a gas tight casing and a starting and a running circuit, a member actuated magnetically through a wall of said casing and movable in response to a predetermined speed of said motor, and a switch for said starting circuit operatively connected to said member.

4. In combination, a gas tight casing, having a portion of the wall thereof formed of non-magnetic material, an electric motor in said casing having a starting circuit and a running circuit, a starting circuit controlling switch disposed on one side of the portion, means for producing a variable magnetic field upon the other side of the portion, and means controlled by variation of the field to control the switch, the means for producing the field and the means for controlling the switch being operatively interconnected solely by the field.

5. In combination, a gas tight casing having a portion of the wall thereof formed of non-magnetic material, an electric motor in said casing having a starting and a running circuit a starting circuit controlling switch on one side of the portion, means for producing a variable magnetic field upon the other side of the portion, means rotatable transversely of the field to control the switch, the means for producing the field and the means for controlling the switch being operatively interconnected solely by the field.

6. In combination, a gas tight casing having a portion of the wall thereof formed of non-magnetic material, an electric motor in said casing having a starting and a running circuit a starting circuit controlling switch on one side of the portion, a magnet rotatable upon the other side of the portion to produce a rotating magnetic field, a member susceptible of magnetic urge disposed upon the side of the portion opposite to the magnet and being operatively interconnected with the circuit controlling switch and being free from mechanical driving connections with the magnet, means attached to the member for yieldably resisting the urge produced by rotation of the magnetic field whereby to prevent operation of the circuit controlling switch until the magnet has reached a predetermined rate of rotation.

GLENN MUFFLY.